Dec. 15, 1925.  
A. P. LITTLE ET AL  
1,565,476
METHOD AND MEANS FOR DETERMINING THE EGG PRODUCTION OF FOWLS
Filed March 1, 1924
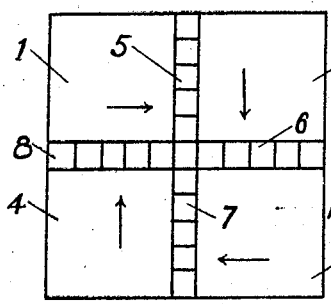
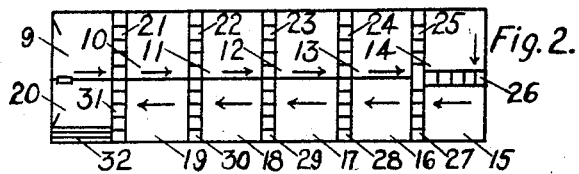
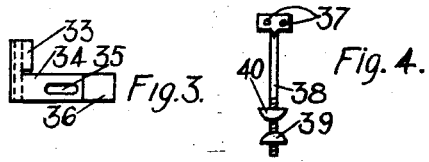
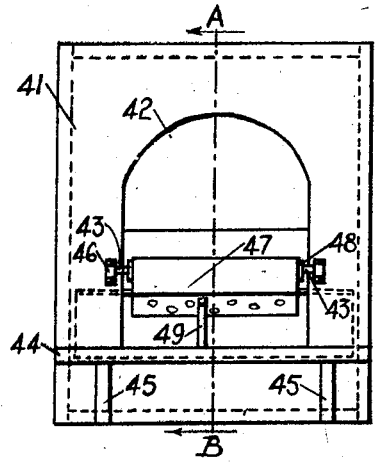
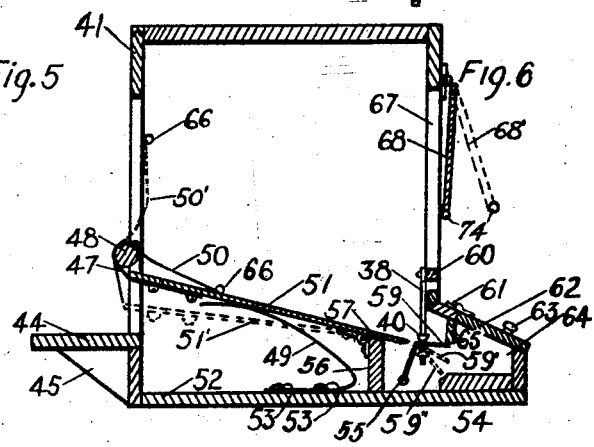
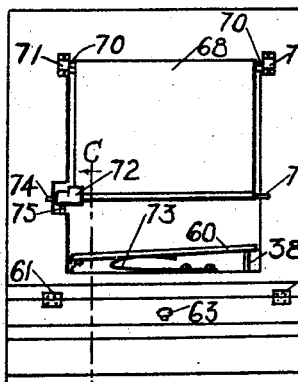
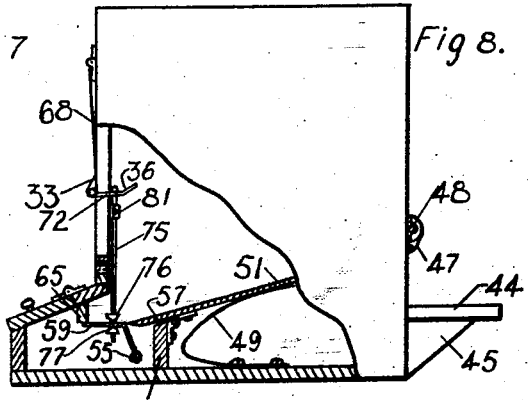
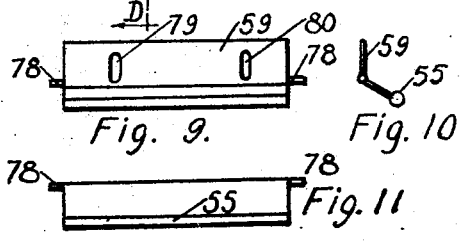
INVENTORS:
Arlington P. Little
Myrtle J. Little Patented Dec. 15, 1925.

1,565,476

UNITED STATES PATENT OFFICE.

ARLINGTON P. LITTLE AND MYRTLE T. LITTLE, OF GOLDEN, COLORADO.

METHOD AND MEANS FOR DETERMINING THE EGG PRODUCTION OF FOWLS.

Application filed March 1, 1924. Serial No. 696,333.

*To all whom it may concern:*

Be it known that we, ARLINGTON P. LITTLE and MYRTLE T. LITTLE, citizens of the United States, residing at Golden, Colorado, have invented certain new and useful Improvements in Method and Means for Determining the Egg Production of Fowls, of which the following is a specification.

Our invention relates to a method of trapnesting fowls, employing main pens or enclosures, connected by intermediate compartments or trap nests through which the fowls pass from one pen to another in predetermined sequence; and has for its object the determination of the egg production of fowls over a period of time. In carrying out our invention, which is not necessarily limited to the particular arrangement, number of pens, number of trap nests, or construction, which we have illustrated, it will be understood that the forms shown may be so modified in arrangement, construction and detail as will adapt it to particular conditions.

In the drawings, Figure 1 is a plan of a four-pen trapnesting system. Figure 2 is a plan of a similar system having twelve pens. Figure 3 is a top view of catch for rear door of trap nest. Figure 4 is a side view of push rod. Figure 5 is a front view of an intermediate compartment or trap nest. Figure 6 is a cross section of the trap nest through line A—B of Figure 5, looking in the direction of the arrows. Figure 7 is a rear view of trap nest, and Figure 8 is a side view of trap nest, showing a cross section through the lines C—D of Figure 7, looking in the direction of the arrows. Figure 9 is a top view of tiltable shelf; Figure 10 is an end view and Figure 11 a side view of this shelf.

Similar characters of reference designate similar parts throughout the several views.

The main pens or enclosures, 1 to 4 inclusive in Figure 1, and 9 to 20 inclusive in Figure 2, communicate with each other through the intermediate compartments or trap nests 5 to 8 inclusive in Figure 1 and 21 to 31 inclusive in Figure 2. 32 represents roosts in pen 20.

A fowl enters the trap nest through the front opening or entrance 42. The platform 51 has hinges 57 at its lower edge, and the weight of the fowl on this platform exerts a pull on the canvas 47, which is attached to the cylinder 48, causing said cylinder to rotate on its bearings 43, 43. The front door 50 is attached to cylinder 48 and the rotation of this cylinder lifts door 50 to the dotted line position 50'. The horizontally projecting lug 66 comes in contact with the inside of front 41 of the trap nest and prevents further outward movement of door 50. The rotation of the cylinder 48 allows the platform 51 to move into the dotted line position 51'.

An egg deposited by the entrapped fowl rolls down the sloping platform 51 onto the tiltable shelf 59, the weight of said egg causing this shelf to move into the intermediate dotted line position 59', further movement of said shelf being prevented by shelf coming into contact with the lower nut 39 of push rod 38 (see Figure 4), which rod passes through the opening 80 of shelf 59 (see Figure 9). In the intermediate position 59' of the shelf 59, the opening between said shelf and the lower edge of beam 65 is not sufficient to allow the egg to pass into the egg chamber 64.

The rear door 68 is held closed against exit of the entrapped fowl by means of the catch 72 (see Figure 3) and the catch rod 75 (see Figure 8), which rod normally projects through the opening 35 of the catch 72. When the shelf 59 is moved into the intermediate position 59', as previously described, the rod 75, which passes through the opening 79 of said shelf (see Figure 9), is permitted to fall vertically downward until the upper end of rod 75 is below the opening 35 of catch 72 and permits the rear door 68 to be pushed outward into or beyond the dotted line position 68' allowing the entrapped fowl to leave through the rear opening 67.

The fowl in leaving the trap nest and stepping on the horizontal piece 60 causes the spring 73 to be compressed, and the downward movement of the piece 60 depresses rod 38 and permits the shelf 59 to move into the lower dotted line position 59''. In position 59'' the opening between the platform 59 and the beam 65 is sufficient to permit the egg on said platform to pass into the egg chamber 64. The shelf 59 now being relieved of the weight of the egg will return to its normal position shown by the full lines because of the action of gravity on the counterweight 55. The rod 75 will thus be pushed upward into its normal position shown in Figure 8.

The catch 72 is rotatable to a limited extent on the shaft or projection 74, its clockwise rotation (referring to Figure 8) being limited through the lug 33 coming into contact with the rear door 68. After the fowl has passed from the nest, the rear door moves under the action of gravity into its closed position shown by the full lines, and the end 36 of the catch 72, coming into contact with rod 75 will be raised and pushed inward on closing rear door 68, until the opening 35 in said catch comes opposite the end of rod 75. Said catch will then drop into the position shown in Figure 8, and in this position will prevent the rear door being pushed outward by a fowl entrapped in the nest.

The projections 74, 74 of door 68 prevent the door from being pushed inward. The rod 75 is held loosely in a vertical position by means of the strap 81.

When the weight of the fowl is removed from the platform 51, the upward pressure of the spring 49 restores said platform to the position shown by the full lines, and the front door 66, under the action of gravity, returns to the full line position.

The egg chamber 64 is provided with a cover 62 held in position by hinges 61 and may be lifted by means of the knob 63. The shelf 44 is supported by braces 45, 45.

The trapnest, views of which are shown in Figures 5, 6, 7 and 8, and certain details in Figures 3, 4, 9, 10 and 11 represents the preferred form, but any suitable arrangement may be employed whereby the entrance of a fowl causes the front opening or entrance to the trap nest to be closed against exit of said fowl or entrance of another fowl through said opening, while said fowl is entrapped within the nest; and to have said obstruction to said entrance removed when said fowl leaves said nest; and further, that any convenient arrangement may be employed which will effectually prevent a fowl from entering said trap nest by other than the entrance designated.

The operation of the trapnesting system herein described is illustrated by the following example: Suppose it is desired to determine the rate of laying of a fowl or of each individual member of a group of fowls. A fowl or group of fowls is placed in one of the pens as No. 1. A fowl in this pen desiring to lay enters a trap nest 5 through its entrance 42, and laying her egg, leaves said trap nest through exit 67 and passes into pen 2. Said fowl on again desiring to lay enters a trap nest 6, deposits her egg and leaves said trap nest through its exit 67 and enters pen 3. This process being twice repeated the said fowl would appear in trap nest 8. The exit of trap nest 8 may be permanently closed so that said fowl will be retained in this trap nest until her identity and record can be noted. The arrows in Figures 1 and 2 indicate the general direction of travel of a fowl or group of fowls through the pens and trap nests.

Figure 2 represents an arrangement substantially similar to Figure 1, but having twelve pens. A fowl placed in 9 and depositing her egg in one of the trap nests 21 enters pen 10 through the trapnest exit 67. Said fowl repeating this process a certain number of times will ultimately appear in pen 20, where, after said fowl goes to roost, or at any other convenient time, her identity may be ascertained.

By noting the time that elapses between date of placing said fowl in pen 9 and that of her appearance in pen 20 and noting the number of eggs laid by said fowl during this period, her rate of laying can be determined. Said fowl may again be placed in 9 and the process described repeated as often as desired.

Any or all of the pens 1 to 4 inclusive or 9 to 20 inclusive may be provided with feed, drink, roosts and other conveniences. They may also, if desired, communicate with exterior yards or enclosures.

The customary present method of determining the egg production of a fowl is to cause said fowl to deposit her egg in a trap nest which remains closed to the exit of said fowl until released by an attendant, who notes the identity of said fowl and enters a notation on her record for each egg laid.

The advantages of our method of determining the rate of laying of a fowl are, first, the labor saved in handling the fowl and in entering the notation of her record, because a fowl entering a first pen and ultimately appearing at last pen will have laid a number of eggs corresponding substantially to the number of intermediate pens or trap nests through which she has passed since the beginning of the cycle, and therefore one handling of the fowl and one notation on the record will suffice for more than one egg laid by said fowl; second, the fowl entering the trap nest and laying is not required to wait for an attendant to release her, but may leave said trapnest at will; third, the danger of breaking the egg or eggs through trampling is reduced; fourth, a fewer number of trap nests is necessary for a given number of fowls, because of the shorter time the fowls are required to remain in the trap nests.

What we claim and desire to secure by Letters Patent is:

1. In a trapnesting system of the character described, comprising a plurality of consecutively arranged pens for fowls, and trapnests interposed between every two consecutive pens, whereby a fowl may pass from one pen to the next in sequence after the laying of an egg.

2. In a trapnesting system of the character described, comprising a plurality of consecutively arranged pens for fowls, and a plurality of laterally aligned trapnests interposed between every two consecutive pens, whereby a fowl may pass from one pen to the next in sequence after the laying of an egg in each successively encountered trapnest until all of said pens have been traversed.

3. In a trapnesting system of the character described, comprising a plurality of consecutively arranged pens for fowls, a plurality of laterally aligned trapnests interposed between every two consecutive pens, said trapnests each comprising a spring elevated inclined platform, a normally open entrance door adapted to be closed by the weight of a fowl upon the spring elevated inclined platform, an egg receptacle adjacent one end of said receptacle and a normally closed exit door retained by a latch; said latch adapted to be released by means associated with said egg receptacle when the latter is actuated by the descending of an egg from said platform upon said receptacle whereby a fowl may pass through said exit door from one pen to the next in sequence after the laying of an egg.

4. In a trapnesting system of the character described, comprising a plurality of consecutively arranged pens for fowls, a plurality of laterally aligned trapnests interposed between every two consecutive pens, said trapnests each comprising a spring elevated inclined platform, a normally open entrance door adapted to be closed by the weight of a fowl upon the spring elevated inclined platform, an egg receptacle adjacent one end of the platform, a normally closed exit door, means normally engaging and holding said exit door in closed position, means actuated by the weight of an egg adapted to release said first mentioned means, means on said second mentioned means to prevent the egg from dropping into said receptacle thereby preventing the first mentioned means from returning to its normal door engaging position, and means operated by the weight of the hen leaving the nest to actuate said second mentioned means to allow the egg to drop into said receptacle and allow said first mentioned means to return to normal door engaging position after the hen has left the nest.

ARLINGTON P. LITTLE.
MYRTLE T. LITTLE.